United States Patent Office 2,843,639
Patented July 15, 1958

2,843,639

PROCESS FOR SECURING AND MAINTAINING CATALYST ACTIVITY OF PHOSPHORIC ACID TYPE CATALYSTS

Gordon E. Langlois, El Cerrito, and Willard M. Haunschild, Walnut Creek, Calif., assignors to California Research Corporation, San Francisco, Calif., a corporation of Delaware No Drawing. Application February 15, 1954
Serial No. 410,436

8 Claims. (Cl. 260—683.15)

The present invention relates to hydrocarbon conversion reactions wherein a phosphoric acid type catalyst is employed. More particularly, the invention has to do with a process of securing and maintaining a high level of catalyst activity during reaction, the process involving a pretreatment or preconditioning of the hydrocarbon reactant material or feed.

The commercial use of phosphoric acid type catalysts in hydrocarbon conversion processes has been practiced extensively. An example is the preparation of motor gasolines by the polymerization in the presence of a phosphoric acid catalyst of light olefins, such as propene and butene ordinarily obtained from refinery $C_3$ or $C_4$ cuts or fractions. Precursors of synthetic detergents, for example, propylene tetramer, are also obtained by a phosphoric acid catalyzed polymerization reaction. Another example of a phosphoric acid catalyzed reaction is the alkylation of aromatics to produce aviation gasoline blending agents, or precursors of phenolic materials, for example, cumene.

Phosphoric acid type catalysts include not only bulk liquid phosphoric acid but also the solid phosphoric acid type prepared by impregnating a diatomaceous earth, e. g., kieselguhr, followed by calcining, as described, for example, in U. S. Patent No. 2,375,724; the acid-film type of phosphoric acid, wherein the acid is disposed as a thin film on an inert, non-porous support such as quartz, as described, for example, in U. S. Patents Nos. 2,135,793 and 2,186,021; and the metal pyrophosphates, e. g., copper pyrophosphate, described, for example, in U. S. Patents Nos. 2,310,161 and 2,414,206. Unusually good catalysts are the bulk liquid phosphoric acid, and the acid-film, the latter, preferably having a film of acid disposed on crushed quartz particles of the order of 28–35 mesh, as taught in U. S. Patent No. 2,579,433.

Thus, while the phosphoric acid type catalyst is known to be very useful, it is also known that its effectiveness deteriorates during use; that is, the catalyst progressively loses activity and becomes deactivated. As a result of extensive laboratory investigations and commercial operating experience over many years, a number of causes of deactivation of the phosphoric acid type catalyst have been recognized, and accordingly, means have been attempted for overcoming them. For example, a common cause of deactivation is the formation of coke and tarry materials during operation, with consequent fouling of the catalyst. An expedient relied on in minimizing such coking, in order to secure satisfactory catalyst life, has been to restrict maximum operating temperature, temperatures of the order of 400° F. having been suggested as upper limits. However, since the effect of catalyst fouling is cumulative, it is ultimately necessary to either discard the catalyst or in the case of the acid-film type, to regenerate it by removing and replacing the acid film, as taught, for example, in U. S. Patent No. 2,479,433.

Catalyst activity also depends on the acid concentration which is a function of the water content of the feed. The water content is normally adjusted to maintain the desired concentration. As is known, the amount of water required in the feed to maintain a given acid concentration in the reactor is dependent on the temperature, pressure, composition of the feed, and fraction of the reaction mix vaporized. The partial pressure of water in the vapor phase in the reactor is maintained equal to the vapor pressure of water over the particular concentration of acid desired at the temperature under consideration. In commercial plants, therefore, means are provided for drying the feed or for addition of water, depending on circumstances.

Another cause of catalyst deactivation resides in the presence in the hydrocarbon feed of certain basic polar compounds, such as ammonia and methylamine, and certain acidic polar compounds, such as hydrogen sulfide and mercaptans. These materials act as poisons for phosphoric acid catalyst and are customarily removed from commercial operations by water or acid scrubbing to remove basic polar compounds, and caustic scrubbing for hydrogen sulfide and mercaptan removal.

Although the hydrocarbon feed may have been treated as above indicated, frequently there occur periods of low catalyst activity during plant operation which cannot be explained on the basis of the above enumerated causes of catalyst deactivation. This is believed due to the presence in the feed of hitherto unidentified catalyst poisons. Moreover, it is believed that these materials are present in the feed only intermittently, and in extremely small quantity, as a result of which their identification and the discovery of means for removing them have been hampered.

It has now been found that the catalyst poisons in question are hydrocarbon-soluble neutral polar bodies which have boiling points higher than the $C_3$ and $C_4$ hydrocarbons, and which are substantially unreactive with, and insoluble in, the caustic and acidic solutions or water customarily employed in feed pretreatment. It is believed, therefore, that neutral polar poisons are formed in the $C_3$ and $C_4$ hydrocarbon streams after their separation by distillation from the parent cracked stocks or owe their existence to the formation of low-boiling azeotropic mixtures during the distillation. It has also been found that removal of these non-caustic reactive and non-acid reactive neutral polar poisons results not only in maintaining the initial level of catalyst activity and conversion, but results also in a decreased rate of coke deposition on the catalyst. Removal of these neutral polar materials thus results in improved operating efficiency not only by increasing production from a given volume of catalyst, but also in extension of the periods between plant shutdowns for catalyst replacement or reactivation. In summary it can be said that poisoning of the phosphoric acid type catalysts by neutral polar compounds is unpredictable, and the mechanism of the poisoning not clearly understood.

Broadly, then, the invention is predicated on the discovery that commercially available olefin-containing light hydrocarbon cuts can be conditioned to lengthen the useful life of phosphoric acid type catalysts employed in hydrocarbon conversion processes, such as alkylation and polymerization, whereby these processes are rendered substantially more efficient. More particularly, the invention contemplates a process which involves subjecting commercially available propene or butene, such as petroleum refinery $C_3$ or $C_4$ cuts or combinations thereof, to a treating step to remove acidic and basic reacting polar compounds such as hydrogen sulfide, mercaptans, ammonia and methylamine, and to another treating step to remove neutral polar compounds. Removal of the neutral polar compounds is conveniently effected by adsorption or by redistillation of the hydrocarbon as described hereinbelow. While the neutral polar materials herein mentioned may include nitrogen or oxygen or sulfur in addition to carbon and hydrogen, it has been found that the sulfur content of the olefin feed, exclusive of that contributed by carbonyl sulfide, can be taken as a measure of a satisfactory treatment and hence of a suitably conditioned hydrocarbon feed stream. Thus, it has been found that the sulfur content, exclusive of that contributed by carbonyl sulfide, of a satisfactorily treated stream does not exceed about 0.005 weight percent, expressed as elemental sulfur, and preferably does not exceed about 0.0015 weight percent, expressed as elemental sulfur.

More specifically, the process of the present invention comprises the steps of treating the olefin stream with a basic reagent, e. g., caustic or alcoholic caustic, to remove acidic polar materials, i. e., sulfur compounds, such as hydrogen sulfide and the mercaptans; washing the caustic-treated olefin stream with water having a pH not exceeding about 8 to remove basic polar compounds, e. g., ammonia and methylamine, the pH of the water or aqueous reagent being preferably below 7, that is, on the acid side, to remove entrained basic reagent in addition to the basic polar compounds; removing the neutral polar compounds, e. g., by adsorption, as with silica gel, and the like, or by distillation. If desired, all polar materials, including acidic and basic polar materials, can be removed by an adsorption process, such as with silica gel. However, for practical purposes the procedure as herein outlined will generally be followed.

A preferred embodiment of the invention contemplates a process comprising the steps of contacting the hydrocarbon feed with a weak nitrogen-containing base, e. g., an amine, such as monoethanolamine or diethanolamine to remove hydrogen sulfide, the amine, if desired, being reused following regeneration, e. g., by stripping with steam; removing the last traces of hydrogen sulfide with a first more dilute caustic reagent, for example, a 5° to 20° Bé. sodium or potassium hydroxide solution, preferably, about a 15° Bé. sodium or potassium hydroxide solution; freeing the feed stream from contained mercaptans by contacting it with a more concentrated caustic solution, e. g., a 20° Bé. to 35° Bé. sodium or potassium hydroxide solution, this treatment being preferably carried out by a two-stage counterflow operation, i. e., one in which partially spent caustic separated in the second or final stage is mixed with fresh hydrocarbon feed to the first stage, the caustic being then separated and sent to regeneration, the partially treated effluent hydrocarbon from the first stage being contacted with freshly regenerated caustic and sparated in the second stage, the spent caustic from the first stage, if desired, being regenerated by stripping the mercaptans out with steam; contacting the mercaptan-free feed stream with water having a pH of 8 or less to remove basic polars, such as ammonia, the water preferably being on the acid side to neutralize any entrained caustic involved in removing mercaptans; removing the neutral polar compounds from the feed stream, such as by adsorption with a granular adsorbent material, for example, alumina gel, silica gel, silica-alumina gel, or charcoal, the gel being reused, if desired, after regeneration, for example, by stripping with steam. In this embodiment of the invention a two-vessel system is conveniently employed, wherein one vessel at a time is on stream while the other is being regenerated. As has already been indicated a suitable hydrocarbon feed stream is one which, as a measure of satisfactory treatment, has a sulfur content, exclusive of that contributed by carbonyl sulfide, not exceeding about 0.005 weight percent, expressed as elemental sulfur, and preferably not exceeding about 0.0015 weight percent, expressed as elemental sulfur. Accordingly, appropriate amounts of adsorbent will be used so as to effect such refinement and will depend on the concentration of the neutral polar materials. In general, one pound of adsorbent will be found satisfactory for the treatment of about 1 to 8 gallons of hydrocarbon feed. Since the effluent from the adsorption step is drier than the feed, water may be added thereto to maintain acid of desired strength in the reaction chamber, as hereinabove indicated. As above indicated, removal of catalyst-poisoning neutral polar compounds can also be effected by a treatment involving distillation of the $C_3$ or $C_4$ hydrocarbon feed stream immediately after the mercaptan removal step. Ordinarily a distillation treatment wherein a high boiling bottoms fraction amounting to between about 1 and about 10%, by weight of the feed stream, is removed from the stream, results in a feed stream having a suitable degree of refinement in terms of the sulfur content hereinabove discussed.

The tables hereinbelow appearing summarize the results obtained in a series of experiments in which a petroleum refinery $C_3$ hydrocarbon stream containing from 35 to 50% propylene was polymerized on phosphoric acid catalyst of the film-acid type. The film-acid catalyst was prepared by soaking 28–35 mesh quartz, disposed as a columnar mass in a reactor, with 75% phosphoric acid, draining, and drying to the desired acid concentration by passing hydrocarbon feed containing a predetermined amount of water.

In every instance the feed was pretreated with caustic to remove hydrogen sulfide to below 5 p. p. m. and mercaptans to below 5 p. p. m. In all cases, the feed stock was pumped through a dilute acid scrubber comprising a tube packed with quartz and filled approximately about half full with a solution of about 2% phosphoric acid in water. The scrubber was jacketed so that the temperature could be controlled, thus serving not only to scrub out any ammonia or nitrogen bases in the feed but also to saturate the feed with water to the desired extent. The hydrated feed was then vaporized in a preheater and passed downflow over the catalyst which was maintained by external heating at the desired temperature. The reaction mix was passed to a continuous stabilizer where the polymer was separated from the tail gas, that is, debutanized. Olefin conversion was determined from the feed and tail gas analyses.

From the olefin conversion, the reaction rate constant was calculated. It has been found that the rate of polymerization of propylene over phosphoric acid catalysts can best be described by the following rate equation:

$$\int_0^f \frac{(1+Bf)^2 df}{(1-f)^2+0.3f(1-f)} = \frac{K}{S}$$

where $f$=fractional conversion of monomer;
$B$=fractional increase in gas volume for complete conversion of monomer;
$K$=specific reaction rate constant;
$S$=space rate in gas volumes at reaction conditions per volume of catalyst voids per hour.

The specific reaction rate constant K is a function of the type of olefin in the feed, the temperature, acid concentration, and quartz mesh size. If these variables are held constant, the reaction rate constant K is a direct index of catalyst activity. The quart size and type of olefin were constant in the experiments described hereinbelow. The variation of K with temperature and acid concentration can be had from the paper "An improved process for polymerization of olefins with phosphoric acid on quartz catalyst," by G. E. Langlois and J. E. Walkey, appearing in such publications as "Proceedings of the Third World Petroleum Congress," Leiden, 1951, or "Petroleum Refiner," vol. 31, No. 8, pages 79–83, August 1952. Values of the reaction rate constant were corrected to a standard set of conditions, that is, 400° F., and 106% orthophosphoric acid. The rate constant at 400° F. and 106% $H_3PO_4$ is hereinafter referred to as the standard rate constant and for the present purposes the catalyst activity is equal to the standard rate constant.

In Table I below, activity ratios rather than actual values of the activity are shown for the various runs, in order to eliminate the effect of secondary variables such as butene content of the propene feed. These activity ratios are obtained by dividing the initial catalyst activity by the activity at the termination of the run. Thus activity ratios approaching unity indicate little change in activity, while ratios in excess of unity indicate degradation of catalyst activity.

pretreatment; in spite of the caustic and water treatments an activity ratio of 3.3 was obtained. In run 9–862, the original poisonous feed of run 14–61 was passed through a column of silica gel continuously prior to entering the reactor. The activity ratio as shown in (a) remained constant at unity for 20 hours. The quantity of feed treated during this period amounted to 2 gallons of feed per pound of gel. After this period the catalyst began to decline in activity as shown in (b), indicating that the capacity of the gel had been exceeded.

During the course of the runs tabulated above it was

*Table I*

| Run Numbers | 14–61 | 9–848 | 9–849 | 9–850 | 9–851 | 9–859 | 9–862 | |
|---|---|---|---|---|---|---|---|---|
| Hours on Stream | 104 | 65 | 71 | 21 | 71 | 22 | 0–20 (a) | 20–73 (b) |
| Reaction Conditions: Catalyst | $H_3PO_4$ on 28–35 Mesh Quartz | | | | | | | |
| Catalyst History | Fresh | Fresh | (1) | Fresh | Fresh | Fresh | Fresh | |
| Average Temperature, °F | 350 | 300 | 300 | 300 | 300 | 300 | 300 | |
| Pressure, p. s. i. g. | 250 | 250 | 250 | 250 | 250 | 250 | 250 | |
| Feed Rate, Liq. v./v./hr | 0.66 | 0.6 | 0.6 | 0.6 | 0.6 | 1.0 | 0.8 | |
| Water Scrubber Temperature, °F | 134 | 89 | 89 | 89 | 89 | 89 | 89 | |
| Calc. Acid Conc., percent $H_3PO_4$ | 102 | 102 | 102 | 102 | 102 | 102 | 102 | |
| Feed Source and Treatment | (2) | (3) | (4) | (5) | (6) | (7) | (8) | |
| Feed Composition, Mol Percent: | | | | | | | | |
| Ethane | 0.6 | 0.4 | 0.6 | 0.2 | 0.3 | | 0.5 | |
| Propene | 46.2 | 49.6 | 50.8 | 17.7 | 45.9 | | 45.6 | |
| Propane | 47.3 | 49.8 | 47.6 | 51.5 | 47.7 | (9) | 46.8 | |
| Butene | 1.9 | | 0.2 | 10.5 | 2.0 | | 2.4 | |
| Butane | 3.9 | 0.2 | 0.7 | 20.1 | 4.1 | | 4.7 | |
| Initial Olefin Conversion, mol percent | 89 | 61 | 61 | 78 | 76 | 84 | 54 | 54 |
| Final Olefin Conversion, mol percent | 59 | 61 | 61 | 28 | 48 | 50 | 54 | 32 |
| Catalyst Activity Ratio | 2.7 | 1.0 | 1.0 | 5.7 | 2.3 | 3.3 | 1.0 | 2.1 |

1 Catalyst from run 9–848.
2 Sample of commercially prepared polymerization plant feed stream, obtained during period of rapidly declining catalyst activity.
3 Feed stream with which normal catalyst activity is exhibited.
4 Eighty percent overhead from (2).
5 Twenty percent bottoms from (2).
6 (2) washed with 15% $H_2SO_4$.
7 A 23% bottoms fraction of (2) which had been caustic and water washed.
8 Sample 2 filtered through silica gel continuously prior to entering reactor.
9 Feed contained 29.1% olefin. Composition similar to feed to 9–850.

In run 14–61 of Table I, a feed stream was employed which was a sample of the water and caustic treated feed to a commercial polymerization plant charging 3000 barrels per day and which feed was causing a large and unexplained decline in the activity of the commercial catalyst. In the pilot plant, the originally fresh catalyst degraded to an activity ratio of 2.7 during 70 hours on stream, and the activity ratio remained constant at about 2.7 during the remainder of the 104 hour run. In run 9–848 a synthetic feed was employed which was similar in composition to that of run 14–61, but with which the catalyst exhibited normal activity. It will be noted in the table that the catalyst activity ratio was still unity after 65 hours. In run 9–849, the catalyst of 9–848 was retained, but the feed was switched to an 80% overhead cut obtained by redistillation of the deleterious feed used in run 14–61. Under these conditions the catalyst maintained the unit activity ratio shown in run 9–848 for 71 hours additional. In run 9–850, fresh catalyst was employed and the bottoms cut from the feed redistillation of run 9–849 was used as feed. As indicated in the table, the catalyst activity ratio increased to 5.7, thus indicating that the catalyst poison was present in the bottoms fraction of the charging stock employed in run 14–61. In run 9–851 the original feed stock of run 14–61 was pretreated with 15% sulfuric acid to insure that all basic polar compounds had been removed in the commercial pretreatment. No substantial improvement over run 14–61 resulted as shown by the catalyst activity ratio 2.3 obtained after 71 hours' operation. In run 9–859 a 23% bottoms fraction of the original feed stock of run 14–61 was caustic and water washed to insure that all acidic polar compounds had been removed in the original commercial further observed that coke deposition on the catalyst was least with the non-poisonous stocks and greatest with the most poisonous stocks.

Obviously, many modifications and variations of the invention, as hereinbefore set forth, may be made without departing from the spirit and scope thereof and, therefore, only such limitations should be imposed as are indicated in the appended claims.

We claim:

1. Process of securing and maintaining a high level of catalyst activity of phosphoric acid type catalysts employed in the conversion of propylene in a hydrocarbon feed, including polymerization and alkylation, said hydrocarbon feed containing basic and acidic catalyst-poisoning polar materials, and, in addition, hydrocarbon-soluble neutral catalyst-poisoning polar materials having boiling points higher than $C_3$ and $C_4$ hydrocarbons and unreactive with aqueous caustic and aqueous acid solutions, which comprises treating the hydrocarbon feed, prior to conversion, with a basic reagent to remove acidic polar materials, washing the resulting hydrocarbon feed with water having a pH not exceeding about 8 to remove basic polar compounds, and treating the washed hydrocarbon feed to remove the neutral polar materials.

2. Process according to claim 1, wherein the neutral polar materials are removed by adsorption to yield hydrocarbon feed having, as a measure of refinement, a sulfur content, exclusive of that contributed by carbonyl sulfide, not exceeding about 0.005 weight percent.

3. Process according to claim 2, wherein the hydrocarbon feed has, as a measure of refinement, a sulfur content, exclusive of that contributed by carbonyl sulfide, not exceeding about 0.0015 weight percent, expressed as elemental sulfur.

4. Process according to claim 1, wherein the neutral polar materials are removed by distillation.

5. Process of securing and maintaining a high level of catalyst activity of phosphoric acid type catalysts employed in the conversion of propylene in a hydrocarbon feed, including polymerization and alkylation, said feed containing basic catalyst-poisoning polar materials, acidic catalyst-poisoning polar materials, including hydrogen sulfide and mercaptans, and hydrocarbon-soluble catalyst-poisoning neutral polar materials having boiling points higher than $C_3$ and $C_4$ hydrocarbons and unreactive with aqueous caustic and aqueous acid solutions, which comprises treating the hydrocarbon feed, prior to conversion, with a weak nitrogen-containing base to remove hydrogen sulfide, treating the resulting hydrocarbon feed with a first more dilute caustic solution to remove residual hydrogen sulfide, treating the hydrogen sulfide-free hydrocarbon feed with another more concentrated caustic solution to remove mercaptans, washing the caustic-treated hydrocarbon material with an aqueous reagent to remove basic polar materials and entrained caustic, and treating the washed hydrocarbon feed to remove the neutral polar materials.

6. Process according to claim 5, wherein the first more dilute caustic solution has a density between about 5° Bé. to about 20° Bé. and the other more concentrated caustic solution has a density between about 20° Bé. and 35° Bé.

7. Process according to claim 6, wherein neutral polar materials are removed by adsorption to an extent that the hydrocarbon feed, as a measure of refinement has a sulfur content, exclusive of that contributed by carbonyl sulfide, not exceeding about 0.005 weight percent, expressed as elemental sulfur.

8. Process according to claim 7, wherein the neutral polar materials are removed with silica gel.

References Cited in the file of this patent

UNITED STATES PATENTS

| | | |
|---|---|---|
| 2,263,043 | McCormick et al. | Nov. 18, 1941 |
| 2,348,017 | Miller | May 2, 1944 |
| 2,579,433 | Holm et al. | Dec. 18, 1951 |
| 2,599,743 | Brooke | June 10, 1952 |
| 2,694,686 | Reeves et al. | Nov. 16, 1954 |
| 2,698,351 | Hale | Dec. 28, 1954 |

OTHER REFERENCES

"Chemical Refining of Petroleum" (Kalichevsky), Reinhold Pub. Corp. (New York), 1942, page 147 relied on.